United States Patent
Yao

(10) Patent No.: US 11,821,472 B2
(45) Date of Patent: Nov. 21, 2023

(54) POWER-OUTPUT TORQUE DETECTION MECHANISM

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 0 days.

(21) Appl. No.: 17/870,799

(22) Filed: Jul. 21, 2022

(65) Prior Publication Data

US 2023/0026432 A1    Jan. 26, 2023

(30) Foreign Application Priority Data

Jul. 22, 2021   (TW) .................................. 110126997

(51) Int. Cl.
| G01L 3/04 | (2006.01) |
| F16D 41/28 | (2006.01) |
| B62M 6/50 | (2010.01) |

(52) U.S. Cl.
CPC ................ *F16D 41/28* (2013.01); *G01L 3/04* (2013.01); *B62M 6/50* (2013.01); *F16D 2300/18* (2013.01)

(58) Field of Classification Search
CPC ....... F16D 41/28; F16D 2300/18; G01L 3/04; G01L 3/108; B62M 6/50; B62M 6/55; B62J 45/411; B62J 45/421
See application file for complete search history.

(56) References Cited

U.S. PATENT DOCUMENTS

| 6,886,416 B2 * | 5/2005 | Tsay ........................ B62M 6/55 |
| | | 73/862.321 |
| 8,485,050 B2 * | 7/2013 | Yao ........................ B62J 45/421 |
| | | 73/862.08 |
| 10,137,959 B2 * | 11/2018 | Liu .......................... B62M 6/55 |
| 11,286,979 B2 * | 3/2022 | Rossberger ............ F16D 41/12 |
| 11,592,056 B2 * | 2/2023 | Rossberger ........... B62J 45/411 |
| 2012/0234108 A1 * | 9/2012 | Janecek .................. B62J 45/42 |
| | | 73/862.338 |
| 2020/0063793 A1 * | 2/2020 | Rossberger ............. B62M 6/50 |
| 2022/0163063 A1 * | 5/2022 | Rossberger ........... G01M 13/04 |
| 2023/0227122 A1 * | 7/2023 | Yao ......................... B62M 6/50 |
| | | 180/206.3 |

* cited by examiner

*Primary Examiner* — Freddie Kirkland, III
(74) *Attorney, Agent, or Firm* — Leong C. Lei

(57) ABSTRACT

A power-output torque detection mechanism includes an axle having two ends to which an input assembly and an output assembly drivable by the input assembly are respectively mounted. A torsion coupling assembly is arranged between the input assembly and the output assembly and the torsion coupling assembly is operable to detect a torque value that is transmitted out in a wired manner. As such, it is possible to fulfill fine and precise detection and transmission of a torque value, while avoiding distortion resulting from noise interference to allow subsequent input of assisting power to be more timely and more accurate. Further, the structure is effectively simplified to allow easy production and maintenance for further reducing overall cost.

8 Claims, 7 Drawing Sheets

POWER-OUTPUT TORQUE DETECTION MECHANISM

TECHNICAL FIELD OF THE INVENTION

The present invention relates to a torque detection technology for power output, and more particularly to a power-output torque detection mechanism that fulfills fine and accurate detection of a torque value and transmits out a detection signal in a wired manner.

DESCRIPTION OF THE PRIOR ART

Output of rotating kinetic energy is often influenced by a reaction force so that increasing power input from an existing drive unit or supplying an additional assisting power is necessary to hold the rotating kinetic energy in a smooth and stable condition. For example, for power-assisted bicycles or electrical bicycles, a conventionally used moment detection mechanism that is used to detect if there is a need for inputting assisting power to a power-assisted bicycle includes a strain gauge attached to a surface of a crank shaft to detect a strain of the crank shaft resulting from deformation caused by a torque during a rotational motion, and a wirelessly transmitting signal is applied through a receiver to control an assisting motor to output power to achieve an effect of assisting a rider to save labor during uphill movement.

In the previously described arrangement, instability of the wireless transmission resulting from interference or blocking during the rotational motion would influence the assisting power outputted from the motor, making the vehicle not operating smoothly. There is also a situation of feedback delay, which leads to problems of assisting power not generated timely.

However, since the above-described arrangement is generally made for rotational motions, the moment detection element (strain gauge) that is used to detect the rotational torque often adopts wireless transmission to output a torque signal. The signal is thus susceptible to being interfered with or being blocked. To resolve the problem that wireless transmission of a signal of detected torque must faces, a solution of using carbon brush like arrangement to do signal transmission has been proposed, yet the structural complication is high and fabrication precision has to be high, making production and maintenance difficult, and this insidiously increases the overall cost.

In other words, in view of the imperfectness of the conventional way of signal transmission for the detection element (the strain gauge), there comes the problem of distortion or delay of torque feedback, which makes the assisting power not suppliable accurately and timely, and eventually losing the effect of power assistance. The present invention is made for overcoming such problems.

SUMMARY OF THE INVENTION

The primary objective of the present invention is to use a wired manner to transmit a detection signal of a torque value in order to avoid distortion resulting from noise interference during transmission of the torque value.

Another objective of the present invention is to implement reliable and accurate output in a wired manner when a detected torque of a rotational axle varies, so as to allow timely and actual input of subsequent assisting power.

A further objective of the present invention to effectively realize simplification of structure, so as to fulfill easy production and maintenance to further reduce the overall cost.

Yet a further objective of the present invention is to allow a detection mechanism to conduct swift and precise detection of a torque value so as to allow assisting power to be generated timely and accurately and thus avoiding occurrence of stagnation or sudden rush-out thereby enhancing correctness, timeliness, and accurateness of assisting power.

DETAILED DESCRIPTION OF THE PREFERRED EMBODIMENT

Figure 1:
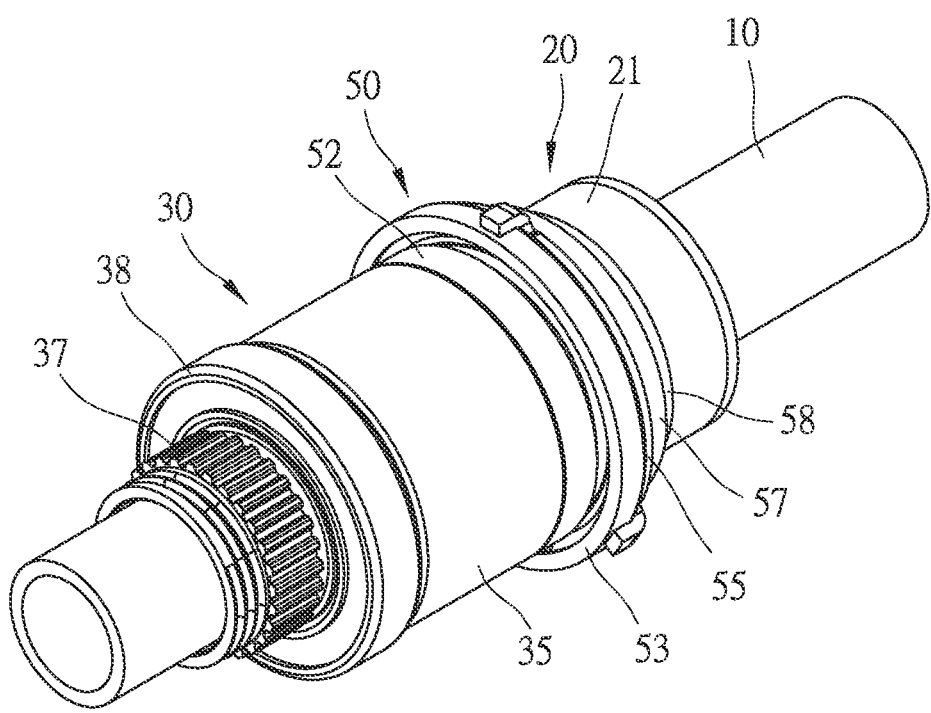
FIG. 1 is a perspective view, in a schematic-form, showing of the present invention.
Figure 2:
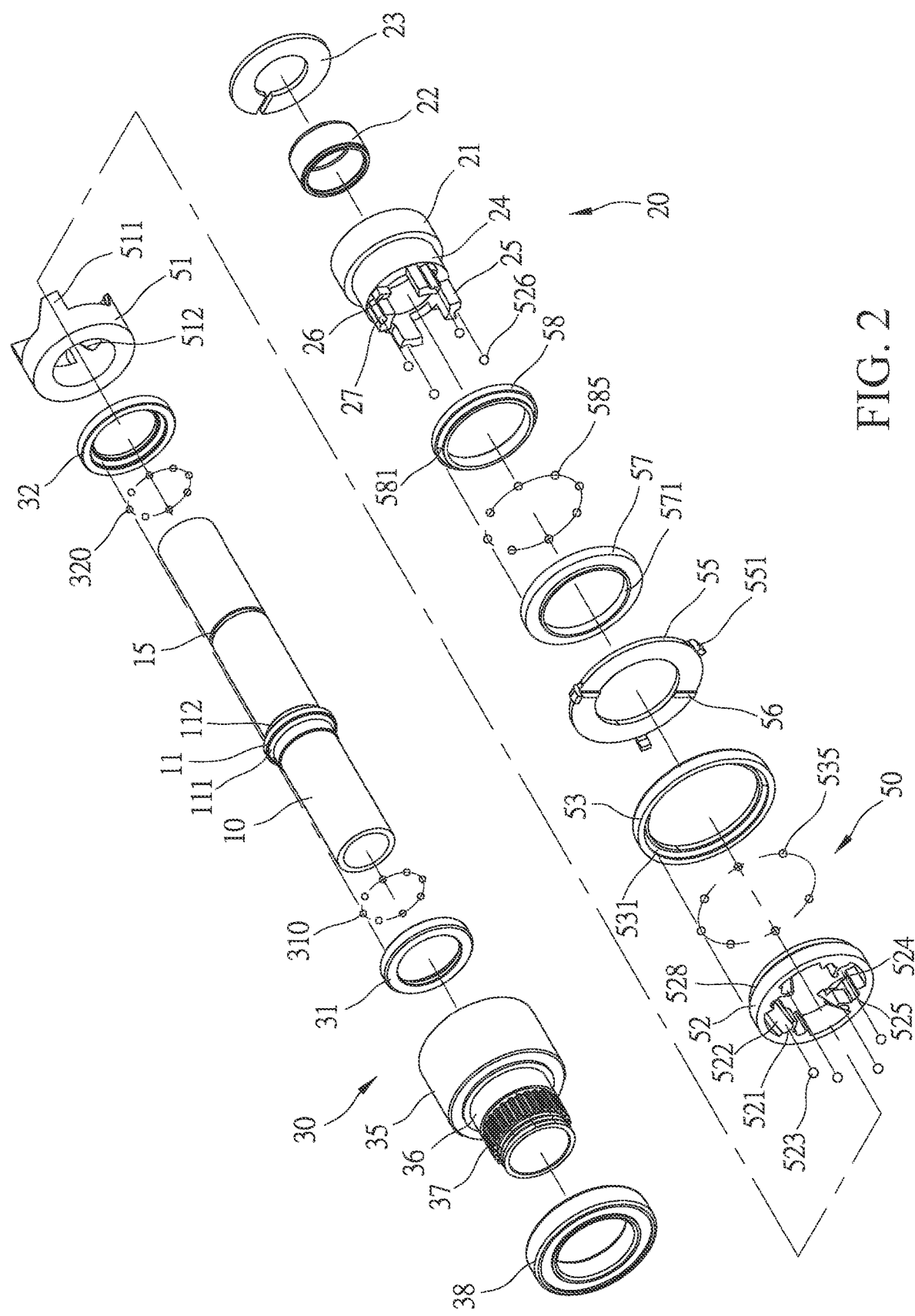
FIG. 2 is an exploded view, in a schematic form, showing the present invention.

A structure of a power-output torque detection according to the present invention mechanism is such that, as shown in FIGS. 1 and 2, an input assembly 20 and an output assembly 30 that is drivable by the input assembly 20 are respectively mounted to two ends of an axle 10, and an inventive feature of the present invention is that a torsion coupling assembly 50 is arranged between the input assembly 20 and the output assembly 30 in order to allow the torsion coupling assembly 50 to swiftly and precisely detect a rotating torque value and to timely and accurately transmit in a wired manner.

Figure 3:
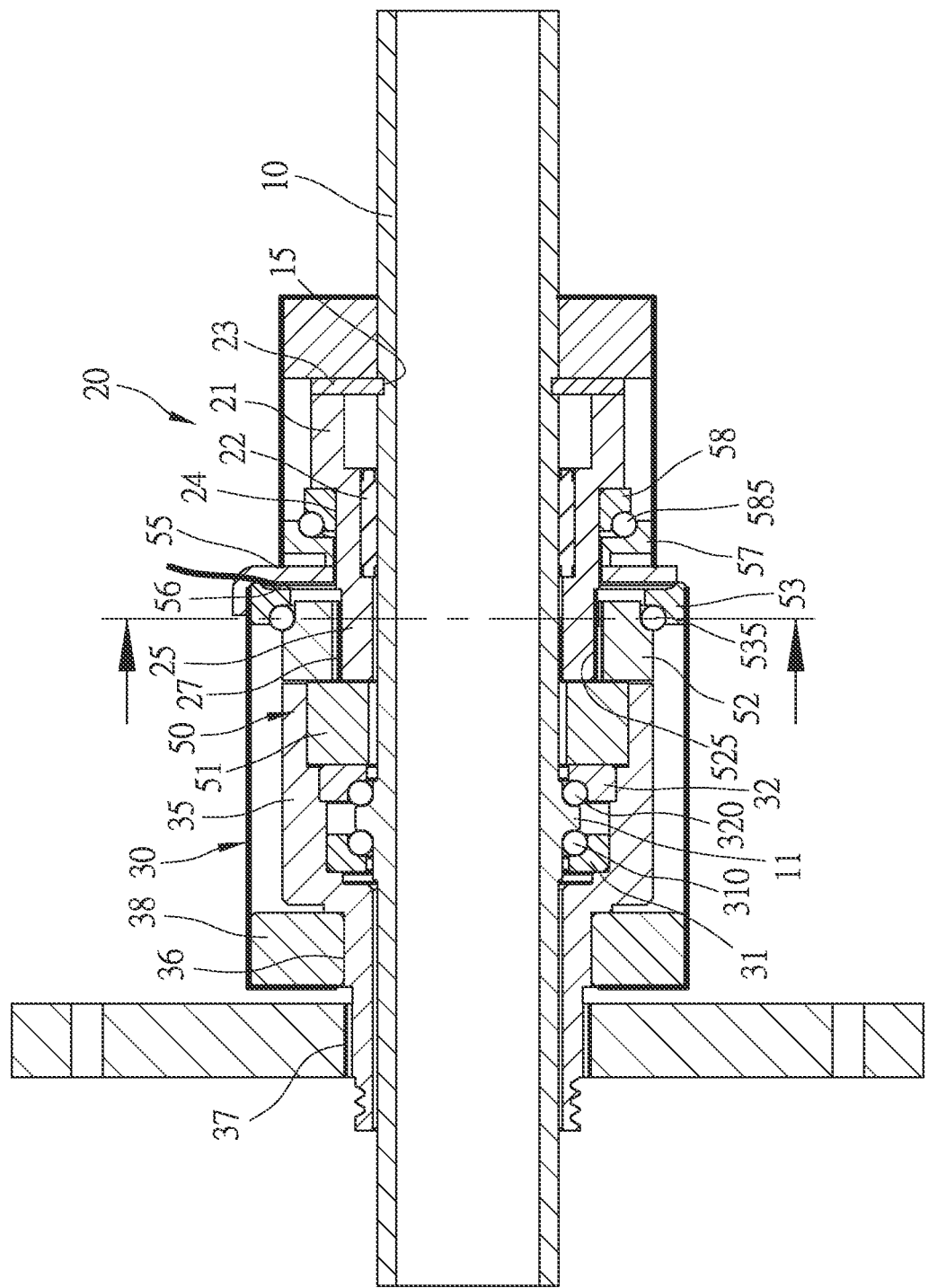
FIG. 3 is a cross-sectional view, taken from a lateral side, in a schematic form, showing the present invention in an assembled form.

Concerning a detailed arrangement of each of main components of the present invention, as shown in FIGS. 2 and 3, the mentioned axle 10 can be a power input axle (such as a crank shaft of a power assisting style bicycle) or a stationary axle (such as a power module axle of an electrical style bicycle), and the axle 10 is provided with an annular flange 11 formed on a circumference of one side thereof that corresponds to the output assembly 30, and corners of top edges of two sides of the annular flange 11 are each formed with a ball groove 111, 112 to receive the output assembly 30 to rotatably fit thereto, and further, the axle 10 is provided with an annular retention groove 15 formed in a circumference of one side thereof that corresponds to the input assembly 20 to constrain a position of the input assembly 20.

Figure 4:
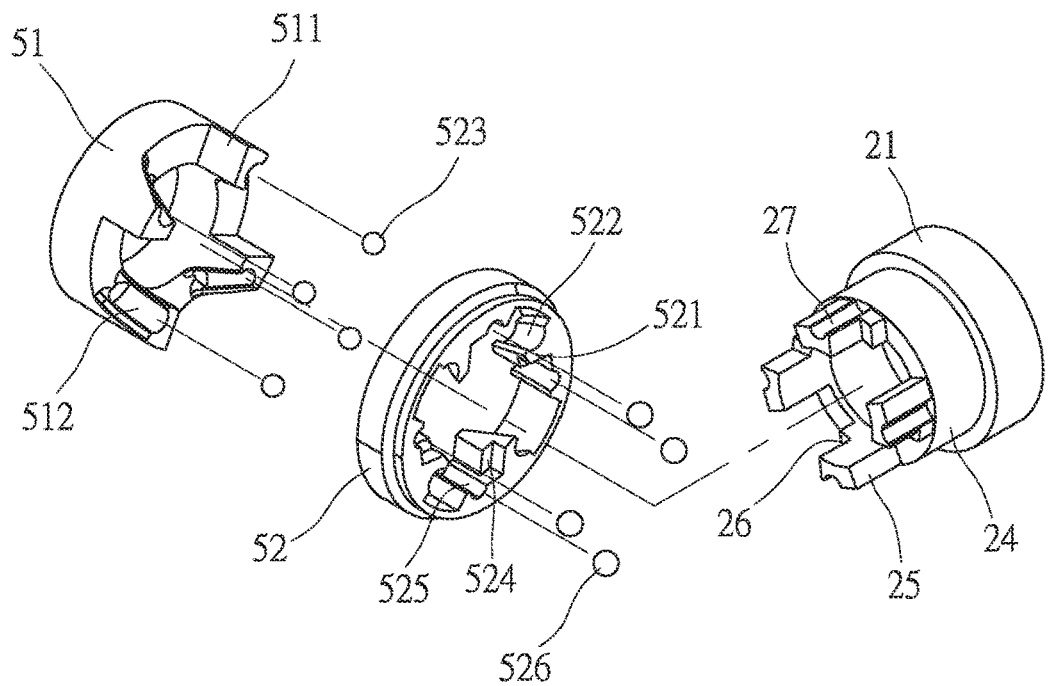
FIG. 4 is an exploded view, in a schematic form, showing a portion of the present invention.
Figure 5:
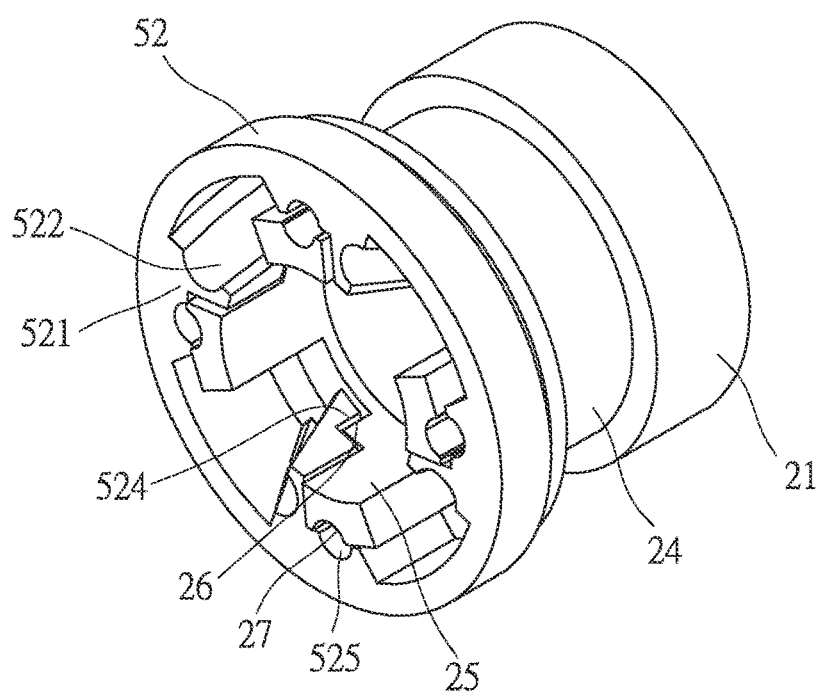
FIG. 5 is a perspective view in a schematic form, showing a portion of the present invention in an assembled form.

The mentioned input assembly 20 uses a one way bearing 22 to count an input sleeve 21 on the axle 10, and the input sleeve 21 is constrained on the axle 10 by using a clip ring 23 that is retained in the previously mentioned annular retention groove 15 (the clip ring 23 being set and retained in position after all components have been properly assembled), and further, the input sleeve 21 is provided, in a projecting form, at one end thereof corresponding to the torsion coupling assembly 50, with a seat section 24 that receives portions of components of the torsion coupling assembly 50 to mount thereon, and the input sleeve 21 is provided, in a projecting form, at an end portion of the seat section 24, with a plurality of equidistant projecting blocks 25 that are extendable into the torsion coupling assembly 50 (as shown in FIGS. 4 and 5). In the present invention, a preferred embodiment of the input sleeve 21 four equidistant projecting blocks 25. Further, each of the projecting blocks 25 is provided with a fitting step 26 formed at a root thereof on one side opposite to an idling direction of the previously mentioned the one way bearing 22, for positioning the torsion coupling assembly 50, and further, the projecting blocks 25 are each formed, on an outer circumferential surface thereof, with an axial ball groove 27 that is extended in an axial direction.

Further, the mentioned output assembly 30 includes an output sleeve 35 fit on the axle 10, and the output sleeve 35 uses, in an interior thereof, two ball bowls 31, 32 that correspond to the two sides of the annular flange 11 of the axle 10, to rotatably sleeve on the axle 10, and the ball bowls 31, 32 of the two sides and the ball grooves 111, 112 of the annular flange 11 are respectively provided with series of rolling balls 310, 320 arranged and clamped therebetween, so as to allow the output sleeve 35 to stably and smoothly rotate on the axle 10, and further, the output sleeve 35 is provided, in a projecting form, on one side thereof that is opposite to the input assembly 20, with a seat section 36 and an engagement toothed section 37, wherein the seat section 36 is provided with a bearing 38 that is mountable on an internal wall of a fixed housing (the fixing housing being for example a bottom bracket of a power assisting style bicycle), and the engagement toothed section 37 may fit into and engage with a toothed plate (such as a tooth plate of a power assisting style bicycle) or may mate with an outer circumference of an output toothed wheel.

Figure 6:
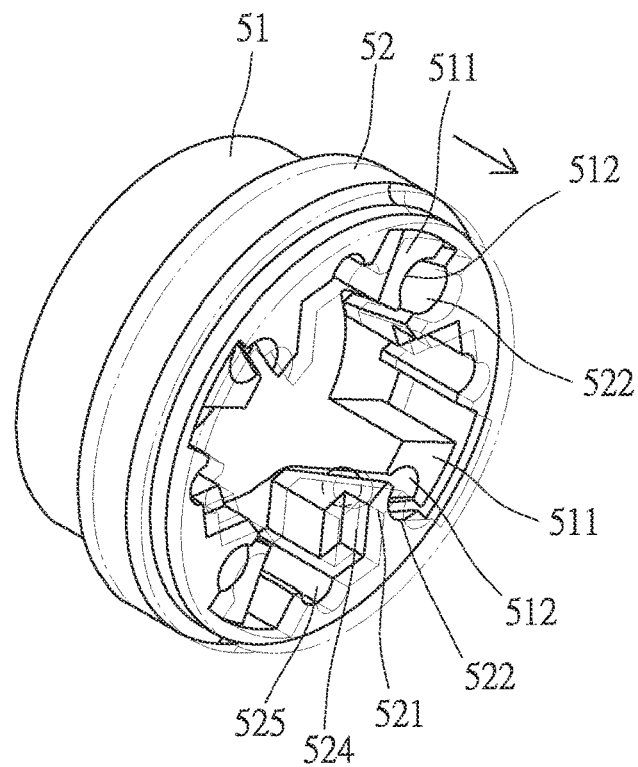
FIG. 6 is a perspective view, in a schematic form, showing operation of a portion of the present invention in an assembled form.
Figure 7:
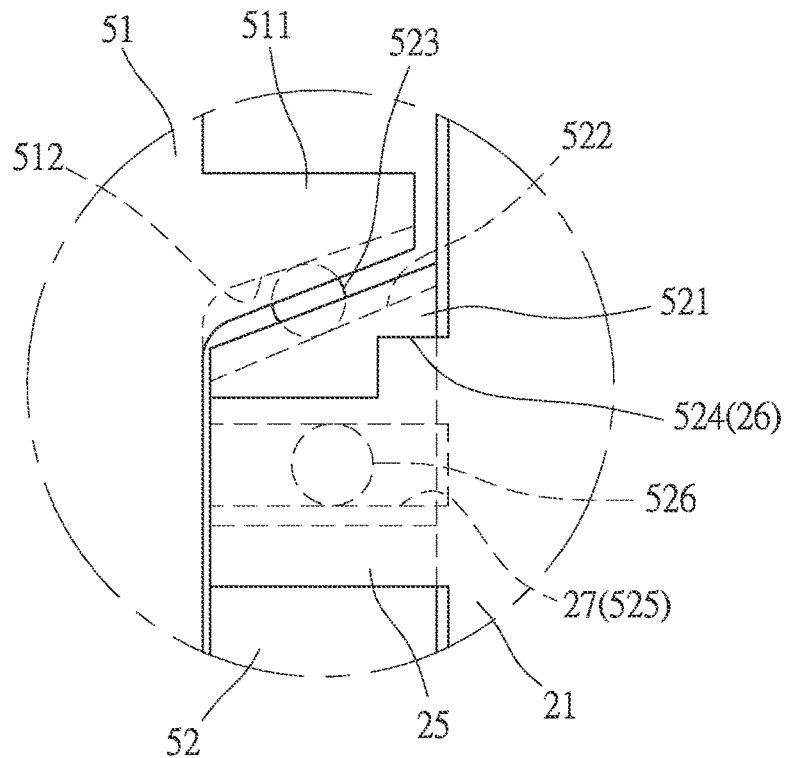
FIG. 7 is a cross-sectional view, taken from a lateral side, in a schematic form, showing the portion of the present invention shown in FIG. 5.
Figure 8:
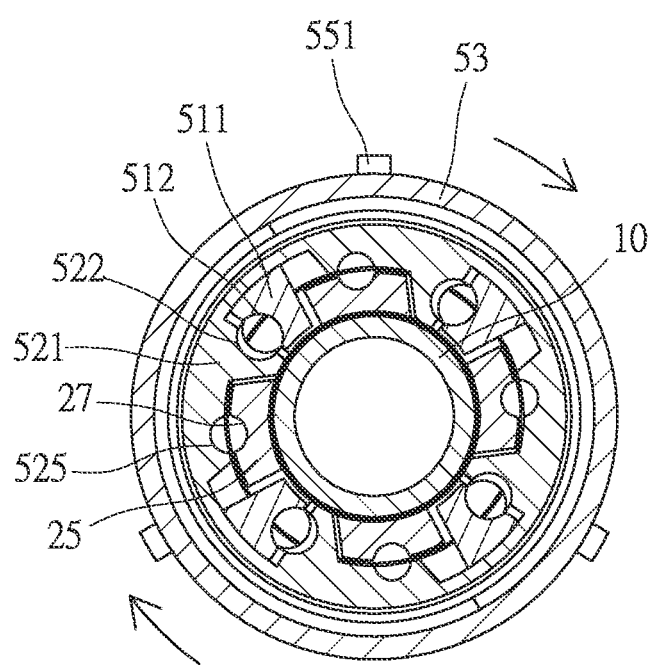
FIG. 8 is a sectional view, taken from an end, in a schematic form, showing the portion of the present invention shown in FIG. 5.

With regard to, the mentioned torsion coupling assembly 50 at least comprises a rotating ring 51, a torque transformation ring 52, and a stationary ring 55, reference being further had to FIGS. 4, 5, and 6, wherein the rotating ring 51 that is sleeved on the axle 10 has an end fixed to the output sleeve 35 of the output assembly 30 to drive the output sleeve 35 to synchronously rotate, and further, the rotating ring 51 is provided, in a projecting form, on an end thereof that is opposite to the output sleeve 35, with a plurality of equidistant chamfered blocks 511 that are extendable into the torque transformation ring 52 (as shown in FIGS. 6, 7, and 8). In the present invention, a preferred embodiment of the rotating ring 51 includes a number of chamfered blocks 511 that corresponds to a number of the projecting blocks 25 of the input sleeve 21. Each of the chamfered blocks 511 is provided with an oblique ball groove 512 (also referred to as a pulley ball groove) formed in one side thereof that is opposite to the idling direction of the one way bearing 22. Further, the torque transformation ring 52 is formed, in an inner circumference thereof, with a plurality of ball groove seats 521 that are respectively interposable or clampable between the projecting blocks 25 of the input sleeve 21 and the chamfered blocks 511 of the rotating ring 51 (as shown in FIGS. 5, 6, and 8), and the ball groove seats 521 of the torque transformation ring 52 are each provided with an oblique ball groove 522 that corresponds to a corresponding one of oblique ball grooves 512 of the rotating ring 51 to receive a pulley ball 523 (as shown in FIG. 7) to interpose or clamp therebetween, in order to push and displace the torque transformation ring 52 during a course of rotation. Further, the ball groove seats 521 of the torque transformation ring 52 are each provided with a fitting step 524 (as shown in FIG. 7) that corresponds to a corresponding one of the fitting steps 26 of the input sleeve 21, in order to have the torque transformation ring 52 positioned on the input sleeve 21. Further, the ball groove seats 521 of the torque transformation ring 52 are each provided with an axial ball groove 525 that corresponds to a corresponding one of the axial ball grooves 27 of the input sleeve 21 to receive a guide ball 526 (as shown in FIG. 7) to interpose or clamp therebetween, in order to allow the torque transformation ring 52 to be pushed to swiftly and stably displace in the axial direction. Further, the stationary ring 55 is positioned on the previously mentioned fixed housing (the fixing housing being for example a bottom bracket of a power assisting style bicycle), and the stationary ring 55 uses, on one side thereof corresponding to the torque transformation ring 52, a plurality of pawl blocks 551 to clamp a first annular ball seat 53. The first annular ball seat 53 and the torque transformation ring 52 are formed, on portions thereof that face each other, with ball grooves 531, 528, respectively, to cooperate with each other to interpose and clamp a series of rolling balls 535, so as to have the torque transformation ring 52 to rotate stably with respect to the stationary ring 55 that is fixed. Further, the stationary ring 55 is provided, on a surface thereof that corresponds to the torque transformation ring 52, with at least strain detection element 56 that is arranged in a radial direction, in order to detect an amount of deformation or a pressure value of axial pushing of the stationary ring 55, and the strain detection element 56 is connected in a wired manner to a control processing unit (not shown in the drawings, such as an assisting motor controller included in a power assisting style bicycle) that is arranged outside. Further, the stationary ring 55 is provided, on an opposite side, with a second annular ball seat 57, and the previously mentioned input assembly 20 is provided, on the seat section 24 of the input sleeve 21 thereof, with a corresponding third annular ball seat 58. The second and third annular ball seats 57, 58 are formed, on portions thereof that face each other, with ball grooves 571, 581, respectively, to cooperate with each other to interpose and clamp a series of rolling balls 585, so as to have t the input assembly 20 to rotate stably with respect to the stationary ring 55 that is fixed.

As such, it is possible to detect, by means of the torsion coupling assembly 50, a rotational torque that the input assembly 20 applies to drive the output assembly 30, and a signal indicating the rotational torque is transmitted out in a wired manner, so that a power-output torque detection mechanism that is capable of swift and precise detection and being free of distortion of transmission, and being accurate and reliable is so constructed.

Figure 9:
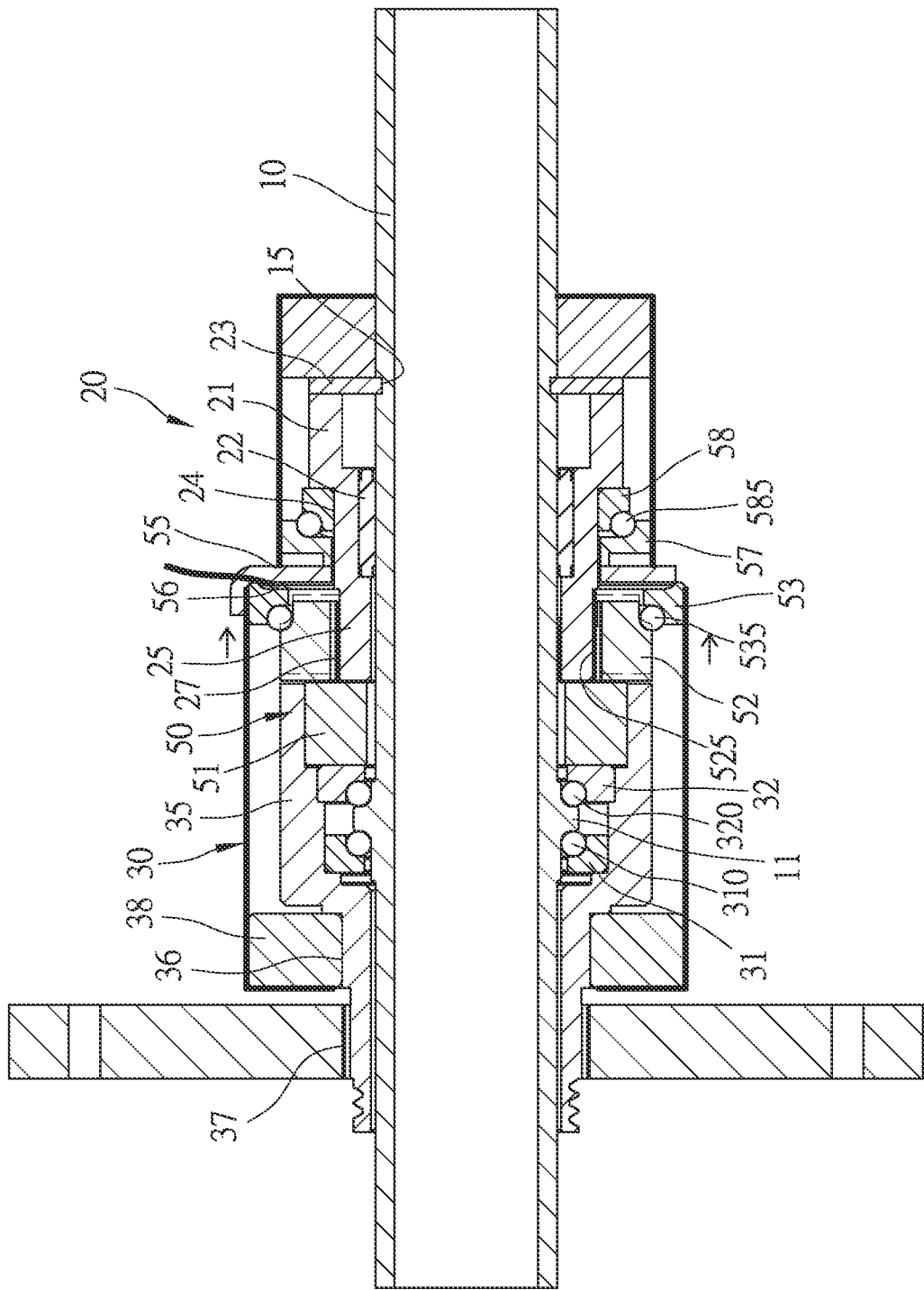
FIG. 9 is a schematic view, taken from a lateral side, demonstrating operation of detection of a torque value conducted with the present invention.

With regards to an actual operation of the structure of the power-output torque detection mechanism according to the present invention, taking a power assisting style bicycle as an example, the axle 10 that is taken as the crank shaft is defined as a main input source, and the input assembly 20 is defined as an assisting input source, as shown in FIG. 9, when the axle 10 is driven to rotate due to cranks (not shown in the drawings) on two sides being pedaled, the input sleeve 21 is driven through the one way bearing 22 of the input assembly 20 to rotate, so that the input sleeve 21 drive, by means of the projecting blocks 25, the torque transformation ring 52 of the torsion coupling assembly 50, and consequently, tightened engagement is induced between the oblique ball grooves 522, 512 of the torque transformation ring 52 and the rotating ring 51 and the pulley balls 523 interposed therebetween to force the rotating ring 51 to synchronously drive the output sleeve 35 of the output assembly 30 to rotate to thereby drive a toothed plate mating with the output sleeve 35.

In case of uphill movement or load being increased, a reaction force from the toothed plate is transmitted through the output sleeve 35 of the output assembly 30 to the rotating ring 51 and the torque transformation ring 52 of the torsion coupling assembly 50, so that by means of the axial ball groove 525, 27 of the torque transformation ring 52 and the input sleeve 21 and the guide balls 526 interposed therebetween, the torque transformation ring 52 is caused to move in an axial direction toward the stationary ring 55 that is fixed, so as to press against the stationary ring 55, making the strain detection element 56 arranged on the stationary ring 55 to conduct detection timely and accurately and for conversion into a value of rotating torque to be transmitted, in a wired manner, to the outside-arranged control processing unit (such as a controller of an assisting motor). As such, the assisting motor may drive the input sleeve 21 of the input assembly 20 as required to fulfill the purpose of supplying assisting power.

Based on the previously provided arrangement and description, the power-output torque detection mechanism according to the present invention makes use of the arrangement of the projecting blocks 25 of the input sleeve 21 of the input assembly 20 and the rotating ring 51 and the torque transformation ring 52 of the torsion coupling assembly 50 to change the rotating torque to an axial displacement, which in combination with the strain detection element 56 arranged on the stationary ring 55 that is considered immobile, allows a detected value of rotating torque to be transmitted out in a wired manner thereby avoiding the problem of the known technique that uses wireless transmission and is susceptible to noise interference that results in distortion, and also allows variation of the detected rotating torque to be timely output through the wired arrangement to allow subsequent input of assisting power to be more accurate and more reliable, and further, the structure is effectively simplified to allow easy production and maintenance for further reducing overall cost.

I claim:

1. A power-output torque detection mechanism, comprising:
   an axle;
   an input assembly, which comprises an input sleeve adapted to be driven by a power, the input sleeve being rotatably mounted on one end of the axle, an end of the input sleeve being extended to form a plurality of equidistant projecting blocks, the projecting blocks being provided with an axial ball groove formed on an outer circumferential surface thereof and extending in an axial direction;
   an output assembly, which comprises an output sleeve drivable by the input assembly, the output sleeve being mounted on an opposite end of the axle; and
   a torsion coupling assembly, which is arranged between the input sleeve and the output sleeve, the torsion coupling assembly at least comprising a rotating ring, a torque transformation ring, and a stationary ring, wherein one end of the rotating ring is fixed to the output sleeve of the output assembly, an end of the rotating ring that is opposite to the output sleeve being extended to form a plurality of equidistant chamfered blocks extendable into an interior of the torque transformation ring, the chamfered blocks being each formed with an oblique ball groove in a side thereof, the torque transformation ring being formed, in an inner circumference thereof, with a plurality of ball groove seats respectively interposable between the projecting blocks of the input sleeve and the chamfered blocks of the rotating ring, the ball groove seats being each formed with an oblique ball groove corresponding to a corresponding one of the oblique ball grooves of the rotating ring to interpose therebetween a pulley ball therebetween, the ball groove seats being each formed with an axial ball groove corresponding to a corresponding one of the axial ball grooves of the input sleeve to interpose therebetween a series of guide balls, the stationary ring being arranged, in a fixed manner, on one side of the torque transformation ring that is opposite to the rotating ring, such that the torque transformation ring is pushable and movable in the axial direction to press against the stationary ring, the stationary ring being provided, on at least a surface thereof, with a strain detection element, the strain detection element being adapted to connect, in a wired manner, to an external control processing unit.

2. The power-output torque detection mechanism according to claim 1, wherein the axle comprises a power input axle, and the input sleeve of the input assembly is mounted by a one way bearing on the axle, the output sleeve of the output assembly being provided, on one end thereof that is opposite to the input assembly, with a seat section and an engagement toothed section extending therefrom, wherein the seat section is provided with a bearing, and the engagement toothed section is adapted to fit to a toothed plate.

3. The power-output torque detection mechanism according to claim 1, wherein the axle is provided, on a circumference of one side thereof that corresponds to the output assembly, with an annular flange, and corners of top edges of two sides of the annular flange are each formed with a ball groove, and the output sleeve of the output assembly is provided with a ball bowl on each of the two sides of the annular flange to each hold a series of rolling balls in an opposite manner, the axle being formed, in a circumference of one side thereof that corresponds to the input assembly, with an annular retention groove to receive a clip ring set at one end of the input sleeve of the input assembly.

4. The power-output torque detection mechanism according to claim 2, wherein the axle is provided, on a circumference of one side thereof that corresponds to the output assembly, with an annular flange, and corners of top edges of two sides of the annular flange are each formed with a ball groove, and the output sleeve of the output assembly is provided with a ball bowl on each of the two sides of the annular flange to each hold a series of rolling balls in an opposite manner, the axle being formed, in a circumference of one side thereof that corresponds to the input assembly, with an annular retention groove to receive a clip ring set at one end of the input sleeve of the input assembly.

5. The power-output torque detection mechanism according to claim 1, wherein the projecting blocks that are provided on an end of the input sleeve to correspond to the torsion coupling assembly, and a fitting step is formed on a side surface of a root of each of the projecting blocks, each of the ball groove seats of the torque transformation ring being provided with a fitting step corresponding to the fitting steps of the input sleeve.

6. The power-output torque detection mechanism according to claim 1, wherein the stationary ring of the torsion coupling assembly is provided, on one side thereof that corresponds to the torque transformation ring, with a plurality of the pawl blocks to clamp and hold a first annular ball seat, and portions of the first annular ball seat and the torque transformation ring that face each other are each provided with a ball groove for holding a series of rolling balls therebetween.

7. The power-output torque detection mechanism according to claim 1, wherein the stationary ring of the torsion coupling assembly is provided, on one side thereof that corresponds to the input assembly, with a second annular ball seat, and the input sleeve of the input assembly is provided with a corresponding third annular ball seat, portions of the second and third annular ball seats that face each other being each provided with a ball groove for holding a series of rolling balls therebetween.

8. The power-output torque detection mechanism according to claim 6, wherein the stationary ring of the torsion coupling assembly is provided, on one side thereof that corresponds to the input assembly, with a second annular ball seat, and the input sleeve of the input assembly is provided with a corresponding third annular ball seat, portions of the second and third annular ball seats that face each other being each provided with a ball groove for holding a series of rolling balls therebetween.

* * * * *